United States Patent
Nishikawa

(10) Patent No.: US 10,888,938 B2
(45) Date of Patent: Jan. 12, 2021

(54) CUTTING MACHINE

(71) Applicant: Koki Holdings Co., Ltd., Tokyo (JP)

(72) Inventor: Tomomasa Nishikawa, Hitachinaka (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 16/408,082

(22) Filed: May 9, 2019

(65) Prior Publication Data

US 2019/0262916 A1 Aug. 29, 2019

Related U.S. Application Data

(63) Continuation of application No. 15/577,628, filed as application No. PCT/JP2016/063519 on Apr. 29, 2016, now Pat. No. 10,286,462.

(30) Foreign Application Priority Data

May 29, 2015 (JP) .................................. 2015109864

(51) Int. Cl.
*B23D 45/04* (2006.01)
*B23D 47/00* (2006.01)
(Continued)

(52) U.S. Cl.
CPC .............. *B23D 45/04* (2013.01); *B23D 47/00* (2013.01); *B25F 5/00* (2013.01); *B25F 5/02* (2013.01); *B27B 5/20* (2013.01); *B27B 9/00* (2013.01)

(58) Field of Classification Search
CPC ...... B23D 45/04; B23D 47/00; B23D 45/042; B23D 45/44; B25F 5/00; B25F 5/02; B25F 5/20; B27B 9/00
See application file for complete search history.

(56) References Cited

U.S. PATENT DOCUMENTS 8,302,519 B2 11/2012 Mccracken et al.
9,827,622 B2 11/2017 Kani et al.
(Continued)

FOREIGN PATENT DOCUMENTS

CN 201271763 7/2009
CN 103056850 4/2013
(Continued)

OTHER PUBLICATIONS

U.S. Appl. No. 15/577,628, Non-Final Office Action dated Sep. 11, 2018, 7 pages.
(Continued)

*Primary Examiner* — Omar Flores Sanchez
(74) *Attorney, Agent, or Firm* — Kilpatrick Townsend & Stockton LLP

(57) ABSTRACT

To provide a cutting machine that suppresses swinging of the cutting portion when the battery pack is attached or detached, the cutting machine includes a cutting portion, a base, and a swing support mechanism. The cutting portion includes: a motor, a motor housing accommodating the motor, an output shaft configured to be rotated upon rotation of the motor, a battery pack serving as a power source of the motor, and a battery pack attaching portion including a pair of rail portions with which the battery pack is engageable, where a cutting blade is configured to be detachably attached to the output shaft. The base has a contact surface on which a workpiece is configured to be placed. The swing support mechanism is connected to the base and the cutting portion and includes a swing shaft extending in parallel to the output shaft. The swing support mechanism supporting the cutting portion such that the cutting portion is swingable about the swing shaft between a top dead center and a bottom dead center in a direction parallel to a side surface of the cutting (Continued)

blade. The pair of rail portions extend in a direction crossing the side surface of the cutting blade.

18 Claims, 12 Drawing Sheets

(51) Int. Cl.
*B25F 5/02* (2006.01)
*B25F 5/00* (2006.01)
*B27B 5/20* (2006.01)
*B27B 9/00* (2006.01)

(56) References Cited

U.S. PATENT DOCUMENTS

| | | |
|---|---|---|
| 10,286,462 B2 | 5/2019 | Nishikawa |
| 2005/0257656 A1 | 11/2005 | Shibata et al. |
| 2011/0198103 A1 | 8/2011 | Suzuki |
| 2011/0284257 A1 | 11/2011 | Ogino et al. |
| 2013/0097878 A1 | 4/2013 | Naito et al. |
| 2013/0314007 A1 | 11/2013 | Yanagihara et al. |
| 2015/0328796 A1 | 11/2015 | Okouchi et al. |
| 2015/0375313 A1 | 12/2015 | Kani et al. |
| 2020/0061797 A1* | 2/2020 | Mok ................. B27B 9/02 |
| 2020/0077852 A1* | 3/2020 | Bayha ............ B23Q 11/0071 |

FOREIGN PATENT DOCUMENTS

| | | |
|---|---|---|
| CN | 103347658 | 10/2013 |
| EP | 2204252 | 7/2010 |
| JP | 2000308268 | 11/2000 |
| JP | 2014079812 | 5/2014 |
| JP | 2014144508 | 8/2014 |
| JP | 2014148015 | 8/2014 |
| WO | 2011099349 | 8/2011 |
| WO | 2012108415 | 8/2012 |
| WO | 2014119131 | 8/2014 |
| WO | 2014119132 | 8/2014 |

OTHER PUBLICATIONS

U.S. Appl. No. 15/577,628, Notice of Allowance dated Jan. 22, 2019, 5 pages.
Chinese Application No. 201680033202.3, Office Action dated Jul. 9, 2018, 7 pages (3 pages for the original document and 4 pages for the English translation).
European Application No. 16802973.4, Extended European Search Report dated Dec. 4, 2018, 8 pages.
International Application No. PCT/JP2016/063519, International Preliminary Report on Patentability dated Dec. 14, 2017, 12 pages.
International Application No. PCT/JP2016/063519, International Search Report and Written Opinion dated Aug. 2, 2016, 14 pages.

* cited by examiner

CUTTING MACHINE

CROSS-REFERENCES TO RELATED APPLICATION

This application is a continuation of U.S. patent application Ser. No. 15/577,628, filed Nov. 28, 2017, which claims priorities from Japanese Patent Application Nos. 2015-109864, filed May 29, 2015. The entire contents of the above noted applications are incorporated herein by reference. Incidentally, the U.S. application Ser. No. 15/577,628 is entered into U.S. national phase from International Application No. PCT/JP2016/063519 filed Apr. 29, 2016 in Japan Patent Office as a Receiving Office, which claims the above described priority.

TECHNICAL FIELD

The present invention relates to a cutting machine, and more specifically, to a cutting machine to which a battery pack is detachably attached.

An electric motor disclosed in Patent Document 1 includes a cutting portion, and a base portion having a sub battery. The cutting portion includes a motor, a circular saw blade driven by the motor, and a main battery. The cutting portion is connected to a base portion via a hinge to be swingable, and is supported to be sildable by two guide bars fixed and supported in parallel above the base portion. By swinging or translate (sliding) the cutting portion with respect to the base portion, cutting operation is performed. The main battery is detachably attached to the cutting portion by being slid in the front-rear direction in accordance with a rail structure in the cutting portion.

PATENT LITERATURE

Patent Document 1: Japanese Patent Application Publication No. 2014-144508

SUMMARY OF INVENTION

Technical Problem

In the conventional electric motor, since the attachment-detachment direction of the main battery (battery pack) is parallel to the side surface of the circular saw blade, when the main battery is attached or detached, the cutting portion may swing or translate (slide) with respect to the base portion, and it is difficult to perform the attaching and detaching operation of the battery. Further, when the attachment and detachment of the main battery is performed in a state where a workpiece is placed on the base portion, the cutting portion swings or translates with respect to the base portion. Thus, the workpiece and the circular saw blade can be brought into contact with each other and the material to be machined may be damaged.

An object of the invention is to provide a cutting machine that suppresses movement of the cutting portion when the battery pack is attached or detached.

Solution to Problem

To give a solution to the above technical problem, the invention provides a cutting machine including a cutting portion, a base, and a swing support mechanism. The cutting portion includes: a motor, a motor housing accommodating the motor, an output shaft configured to be rotated upon rotation of the motor, a battery pack serving as a power source of the motor, and a battery pack attaching portion including a pair of rail portions with which the battery pack is engageable, where a cutting blade is configured to be detachably attached to the output shaft. The base has a contact surface on which a workpiece is configured to be placed. The swing support mechanism is connected to the base and the cutting portion and includes a swing shaft extending in parallel to the output shaft. The swing support mechanism supporting the cutting portion such that the cutting portion is swingable about the swing shaft between a top dead center and a bottom dead center in a direction parallel to a side surface of the cutting blade. The pair of rail portions extend in a direction crossing the side surface of the cutting blade According to the above configuration, since the attachment-detachment direction of the battery pack is the direction crossing the swinging direction, the cutting portion is hard to move (swing) at the time of attaching and detaching the battery pack, and it is easy to perform the attaching and detaching operation of the battery pack. Further, damage to the workpiece placed on the base can be reduced.

Preferably, the battery pack attaching portion is disposed in the motor housing.

According to the above configuration, by providing the battery pack attachment portion in the motor housing, the number of components can be reduced, and the cutting portion can be downsized. Therefore, the battery pack attachment portion can be manufactured and assembled with a simple structure. Further, when lead wires are wired from the battery pack attachment portion to the motor, since wiring can be performed without passing through other housings, the structure can be simplified and the assembling also can be facilitated.

It is preferable that the motor housing is constituted by at least two split pieces each having a mating surface parallel to an axial direction of a rotating shaft of the motor, and that the pair of rail portions have one rail and another rail those individually positioned at different ones of the at least two split pieces. The at least two split pieces contact with each other at the mating surfaces, According to the above configuration, the rail portion can be manufactured without dividing in the attachment-detachment direction of the battery pack. Therefore, the accuracy of the rail portion is secured, and the battery pack can be smoothly attached and detached.

Preferably, the cutting machine further includes a connecting terminal disposed in the battery pack attaching portion and interposed between the at least two split pieces. The connecting terminal is electrically connected to the motor.

According to the above configuration, since the connecting terminal is assembled so as to be interposed by at least two split pieces, there is no need for a metal fitting for mounting the connecting terminal to the motor housing. Therefore, the motor housing can be easily assembled, while reliably holding the connecting terminal.

Preferably, the cutting machine further includes a display portion configured to display remaining capacity of the battery pack, and the display portion is interposed between the at least two split pieces.

According to the above configuration, since the battery remaining capacity display portion is assembled so as to be interposed by at least two split pieces, there is no need for a metal fitting for mounting the battery remaining capacity display portion to the motor housing. Thus, the motor housing can be easily assembled, while reliably holding the battery remaining capacity display portion.

Preferably, the motor is a brushless motor including a stator fixed in the motor housing, and the cutting machine further includes an inverter circuit configured to control the stator and output of the motor. The inverter circuit is disposed within an overall length of the battery pack in the axial direction of the rotating shaft of the motor.

According to the above configuration, since each component is disposed so as to be accommodated within the overall length of the battery pack, the cutting machine can be downsized with the reduced full width.

Preferably, the cutting portion further includes an operating handle and a conveying handle. The operating handle includes a trigger configured to be operated by an operator to turn on and off the motor. The operating handle and the conveying handle are arrayed in the direction parallel to the side surface of the cutting blade. The battery pack attaching portion is disposed between the operating handle and the conveying handle in the direction parallel to the side surface of the cutting blade.

According to the above configuration, since the battery pack attachment portion is provided between the conveying handle and the operating handle, the distance from the battery pack attachment portion to both handles becomes shorter. Accordingly, it is facilitated to grasp one of the handles and stabilize the cutting portion at the time of attachment and detachment of the battery pack.

Preferably, the battery pack attached to the battery pack attaching portion is positioned below the conveying handle when the cutting portion is positioned at the bottom dead center.

According to the above configuration, since the battery pack is located below the conveying handle in a state where the cutting portion is fixed at the bottom dead center position (at the time of conveyance), the cutting machine can be downsized by decreasing its entire height when the cutting machine is conveyed.

Preferably, the cutting machine further includes a sliding supporting mechanism slidably supporting the cutting portion in a sliding direction parallel to the contact surface. The pair of the rail portions extend in a direction perpendicular to the sliding direction when the cutting portion is positioned at the bottom dead center.

Preferably, the sliding supporting mechanism includes a slide pipe slidably supporting the cutting portion.

According to the above configuration, the attachment-detachment direction and the sliding direction of the battery pack are different from each other. Therefore, the cutting portion is hard to move (slide) when attaching and detaching the battery pack, and the battery pack can be easily attached and detached. Further, damage to the workpiece placed on the base can be suppressed.

Preferably, each of the motor and the battery pack attaching portion is arrayed in a direction perpendicular to the output shaft.

According to the above configuration, the cutting machine can be downsized by decreasing its axial dimension.

Advantageous Effects of Invention

Regarding the cutting machine according to the invention, the cutting portion can be suppressed from moving when the battery pack is attached or detached.

DESCRIPTION OF EMBODIMENTS

First Embodiment

Figure 1:
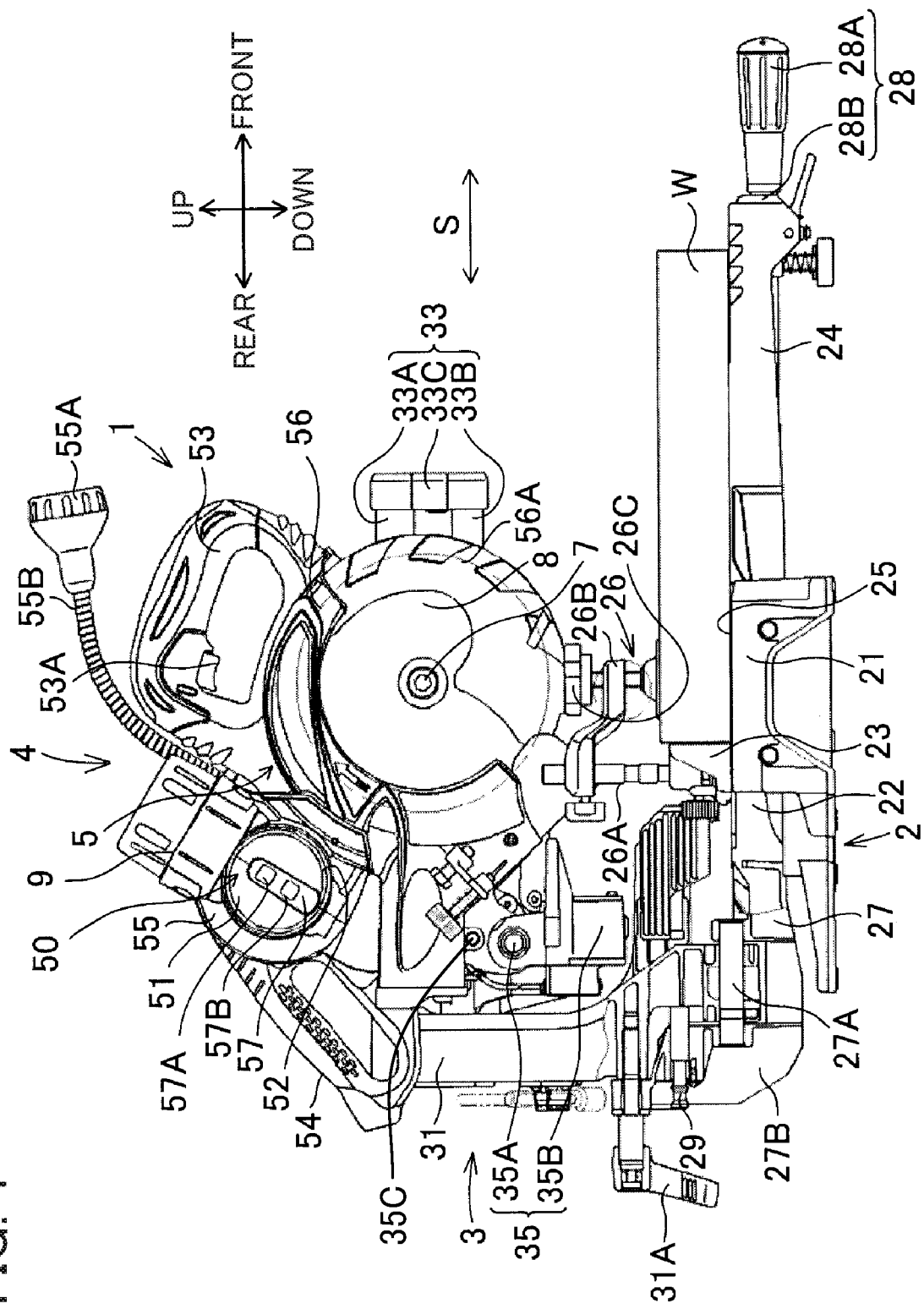
FIG. 1 is a side view of a table-top cutting machine according to a first embodiment of the invention in a state where a cutting portion is positioned at a spaced position.

A desktop cutting machine according to an embodiment of the invention will be described below with reference to FIGS. 1 to 9. A table-top cutting machine 1 as an example of the cutting machine illustrated in FIG. 1 mainly includes a base portion 2, a support portion 3 connected to the base portion 2, and a cutting portion 4 supported by the support portion 3. The cutting portion 4 includes a housing 5, a motor 6 equipped with a motor output shaft 61 (FIG. 7), an output shaft 7 driven by the motor 6, a cutting blade 8 detachably mounted on the output shaft 7, and a battery pack attachment portion 10 (FIG. 2) on which the battery pack 9 is detachably mounted. The support portion 3 is an example of the swing support mechanism of the invention. The motor output shaft 61 is an example of the rotating shaft of the invention.

Figure 2:
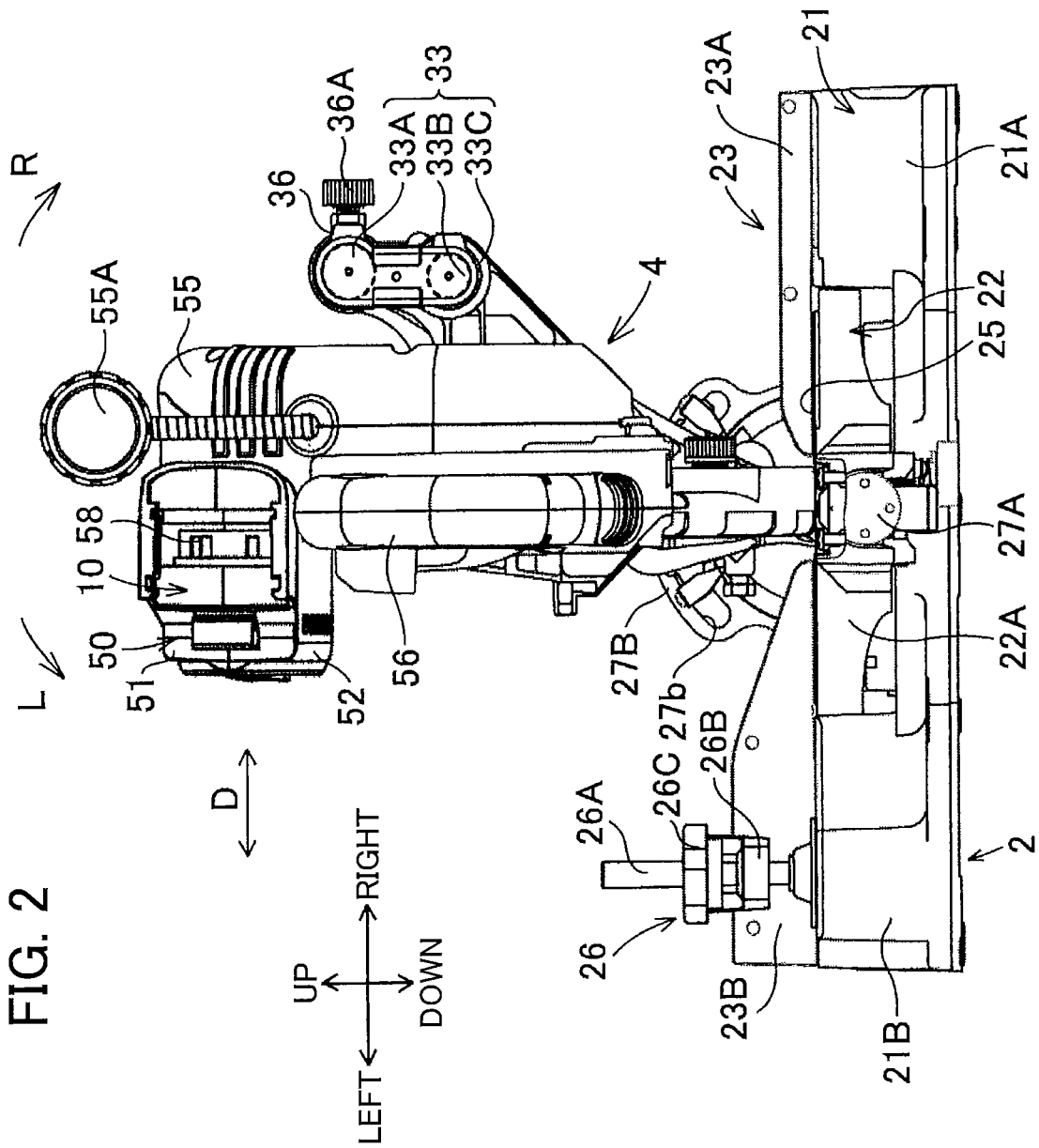
FIG. 2 is a front view of the table-top cutting machine according to the first embodiment of the invention in a state where a battery pack is detached from the table-top cutting machine.

In FIG. 1, the side on which the cutting portion 4 is provided with respect to the base portion 2 is defined as the upward direction, and the reverse side thereof is defined as the downward direction. A sheet right side of FIG. 1 is defined as the front side, and the reverse side thereof is defined as the back side. As illustrated in FIG. 2, the left-right direction viewed from the front side is defined as the right direction and the left direction, respectively. In the following description, when referring to a direction such as the upward direction, it includes not only the identical upward direction but also a substantially upward direction.

Figure 6:
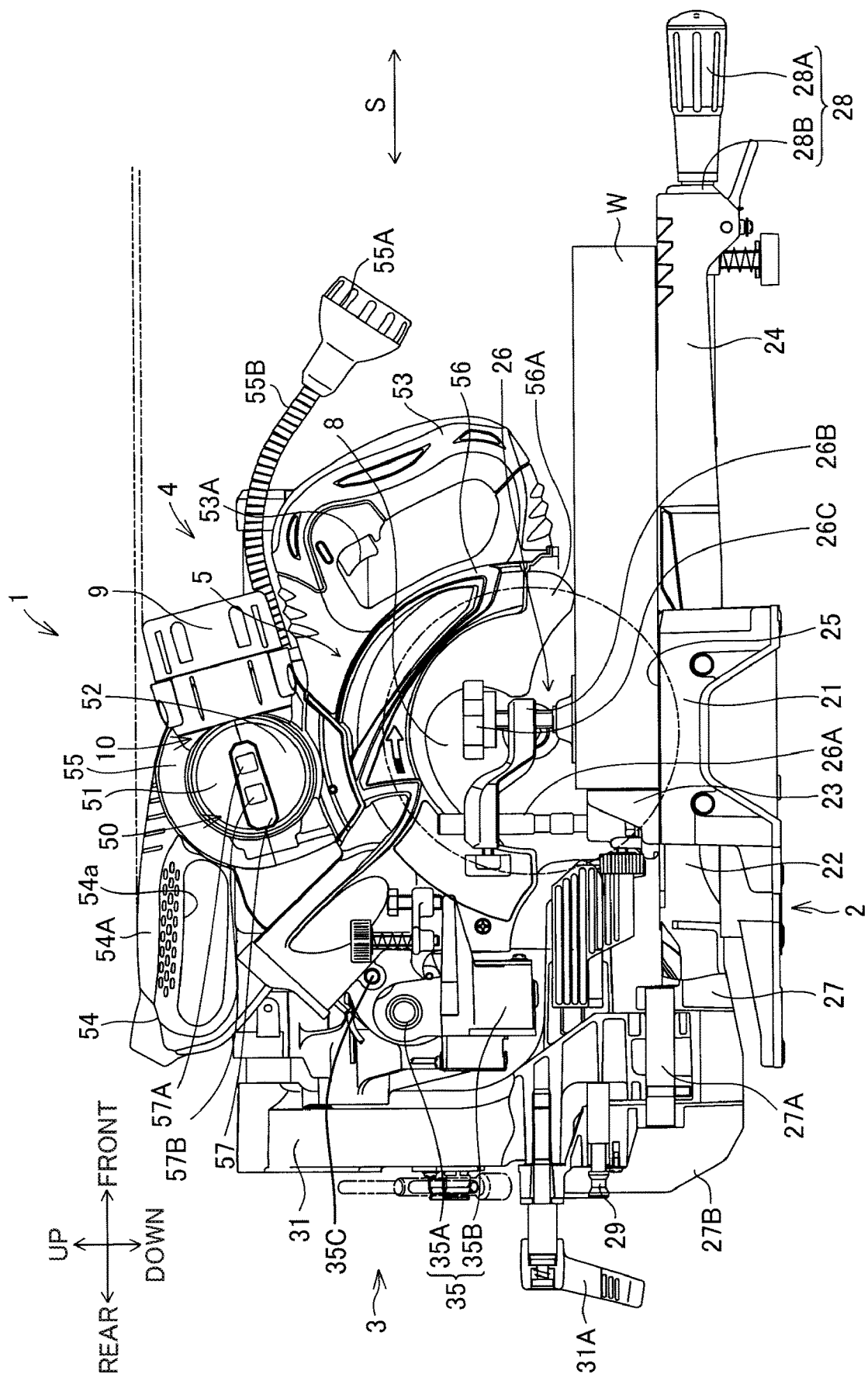
FIG. 6 is a side view of the table-top cutting machine according to the first embodiment of the invention in a state where the cutting portion is positioned at a proximity position.

The cutting portion 4 is capable of swinging about (as an axis) a swing shaft 35A (a shaft extending in the left-right direction) to be described later which is parallel to the output shaft 7, with respect to the base portion 2. Specifically, the cutting portion 4 is capable of swinging between a spaced position at which the cutting blade 8 and the base portion 2 illustrated in FIG. 1 are farthest from each other and a proximity position at which the cutting blade 8 illustrated in FIG. 6 is located at the lowest position. The spaced position is an example of the top dead center of the invention, and the proximity position is an example of the bottom dead center of the invention.

The cutting portion 4 can tilt with respect to the base portion 2 about an tilting shaft portion 27A (extending in the front-rear direction) to be described later that is orthogonal to the output shaft 7. As illustrated in FIG. 2, when viewed from the front side, the cutting portion 4 can tilt with respect to the base portion 2 in a clockwise direction R and a counterclockwise direction L to be described later. As illustrated in FIG. 1, the cutting portion 4 is movable in a sliding direction S (the front-rear direction) with respect to the base portion 2. The detailed configuration thereof will be described later.

The base portion 2 has a base 21, a turntable 22 disposed on the base 21, a fence 23 provided on the base 21, and a vise device 26 for fixing a wood piece W. The upper surfaces of the base 21 and the turntable 22 form a contact surface 25 on which the wood piece W is placed. As illustrated in FIG. 2, the base 21 is composed of a pair of a left base 21A and a right base 21B.

As illustrated in FIGS. 1 and 2, the turntable 22 is rotatable around a rotation shaft (not illustrated) extending in the vertical direction with respect to the base 21, and is disposed between the right base 21B and the left base 21A. The turntable 22 includes: a turntable main body portion 22A having a substantially circular truncated cone shape, a protruding portion 24 protruding forward from the turntable main body portion 22A, and a housing support portion 27 which supports the support portion 3. A groove portion (not illustrated) is formed on the upper surface of the turntable 22. The groove portion (not illustrated) is located at the same position as an intersection position when the cutting blade 8 swings downward and intersects with the turntable 22 in a side view. The cutting edge of the cutting blade 8 is accommodated in and passes along the groove portion.

The protruding portion 24 is provided with a restricting operation portion 28 which restricts the pivoting of the turntable 22 with respect to the base 21. The restricting operation portion 28 is supported by the protruding portion 24, and includes a grasping portion 28A and a restricting portion 28B. The grasping portion 28A can be grasped by an operator and extends forward from the protruding portion 24. The restricting portion 28B is screwed forward and backward by the rotational operation of the grasping portion 28A to be movable inside the protruding portion 24 in the front-rear direction, and includes a rear end surface capable of abutting against and being spaced apart from the base 21. When the rear end surface of the restricting portion 28B is pressed against the base 21, the turntable 22 is fixed to the base 21 and the pivoting of the turntable 22 with respect to the base 21 is suppressed.

The vise device 26 includes a vise shaft 26A extending in the vertical direction, a screw holder 26B, and a knob 26C. The screw holder 26B is provided on the vise shaft 26A so as to be movable in the vertical direction, and the distance from the contact surface 25 can be adjusted depending on the size of the wood piece W. By operating the knob 26C, the wood piece W can be fixed to the vise device 26.

As illustrated in FIG. 1, the housing support portion 27 is disposed at an opposite position (the position rotated by 180☐ about a rotating shaft (not illustrated)) of the protruding portion 24 with respect to the rotation shaft (not illustrated) of the turntable 22. That is, the housing support portion 27 is disposed behind the turntable 22. The housing support portion 27 has a tilting shaft portion 27A located on an extension line of a groove portion (not illustrated) of the turntable 22 and extending in the front-rear direction, and a tilting support portion 27B upstanding upward from the rearmost end portion. The housing support portion 27 is an example of the tilt angle adjusting mechanism of the invention.

As illustrated in FIG. 2, the tilting support portion 27B is formed with an arcuate elongated hole 27b penetrating in the front-rear direction and centered on the tilting shaft portion 27A. A clamp 31A to be described later is inserted into the elongated hole 27b. A set pin 29 serving as a positioning member at right angles is mounted to the tilting support portion 27B so as to be capable of being pulled out in the front-rear direction. In a state in which the set pin 29 is inserted, the cutting portion 4 can tilt only in the counterclockwise direction L. In a state in which the set pin 29 is pulled out, the cutting portion 4 can tilt in the clockwise direction R and the counterclockwise direction L. The tilting shaft portion 27A is an example of the tilting shaft of the invention.

The fence 23 is provided on the base 21 and at the upper position of the turntable 22. As illustrated in FIG. 2, the fence 23 has a left fence 23A and a right fence 23B respectively corresponding to the left base 21A and the right base 21B, and the front surfaces of the left fence 23A and the right fence 23B are disposed to be located on the same plane to position the wood piece W (FIG. 1).

As illustrated in FIGS. 1 and 2, the support portion 3 has a holder 31, a slide support portion 33, a swinging support portion 35, and a slide portion 36. The holder 31 is supported by the housing support portion 27 via the tilting shaft portion 27A. A clamp 31A is screwed to the holder 31, and the clamp 31A is inserted into the elongated hole 27b (FIG. 2) of the tilting support portion 27B. By tightening the clamp 31A, the holder 31 is fixed to the tilting support portion 27B. That is, the cutting portion 4 cannot tilt in the counterclockwise direction L and the clockwise direction R illustrated in FIG. 2. By loosening the clamp 31A, the holder 31 can be tilted about the tilting shaft portion 27A. That is, the cutting portion 4 can tilt in the counterclockwise direction L and the clockwise direction R illustrated in FIG. 2. Since the clamp 31A is inserted into the elongated hole 27b, the angle at which the holder 31 can tilt with respect to the tilting support portion 27B is limited to the range within which the clamp 31A can move in the elongated hole 27b.

The slide support portion 33 has two guide bars 33A and 33B. Each of the guide bars 33A and 33B is in the form of a pipe having substantially the same shape, and is arranged in parallel to the vertical direction. Each of the guide bars 33A and 33B is parallel to the upper surface (contact surface 25) of the base portion 2, and is fixed to the holder 31 such that their respective axial directions coincide with the front-rear direction. Specifically, these guide bars 33A and 33B are fixed to the holder 31 in a non-detachable manner by bolts (not illustrated) screwed into the holder 31, respectively. The slide support portion 33 is an example of the sliding supporting mechanism of the invention. The guide bars 33A and 33B are an example of slide pipes.

At the front end portions of the guide bars 33A and 33B, a connecting member 33C is provided. The guide bars 33A and 33B are connected to each other through the connecting member 33C. Specifically, two holes extending in the front-rear direction are formed in the connecting member 33C, and the front end portions of the guide bars 33A and 33B are inserted into and fixed to the holes, respectively.

The swinging support portion 35 has a swing shaft 35A extending in the left-right direction and a pair of swinging wall portions 35B extending in the vertical direction in the rear view. The swinging support portion 35 is configured to move integrally with the slide portion 36. The swing shaft 35A is bridged between a pair of swinging wall portions 35B and swingably supports the cutting portion 4. A spring (not illustrated) is mounted to the swinging support portion 35 to urge the cutting portion 4 in the direction from the proximity position to the spaced position.

As illustrated in FIG. 2, the slide portion 36 is formed with two through-holes extending in parallel to the front-rear direction, and the guide bars 33A and 33B are inserted into the through-holes, respectively. When the slide portion 36 slides with respect to the guide bars 33A and 33B, the swinging support portion 35 can move in the sliding direction S (front-rear direction). That is, the cutting portion 4 can move in the sliding direction S along the guide bars 33A and 33B. An operation knob 36A, which is screwed forward and can protrude into the slide portion 36, is threadedly engaged with the slide portion 36. By screwing the operation knob 36A to advance and press the guide bar 33A against the slide portion 36, the slide portion 36 can be fixed to the guide bars 33A and 33B.

Figure 7:
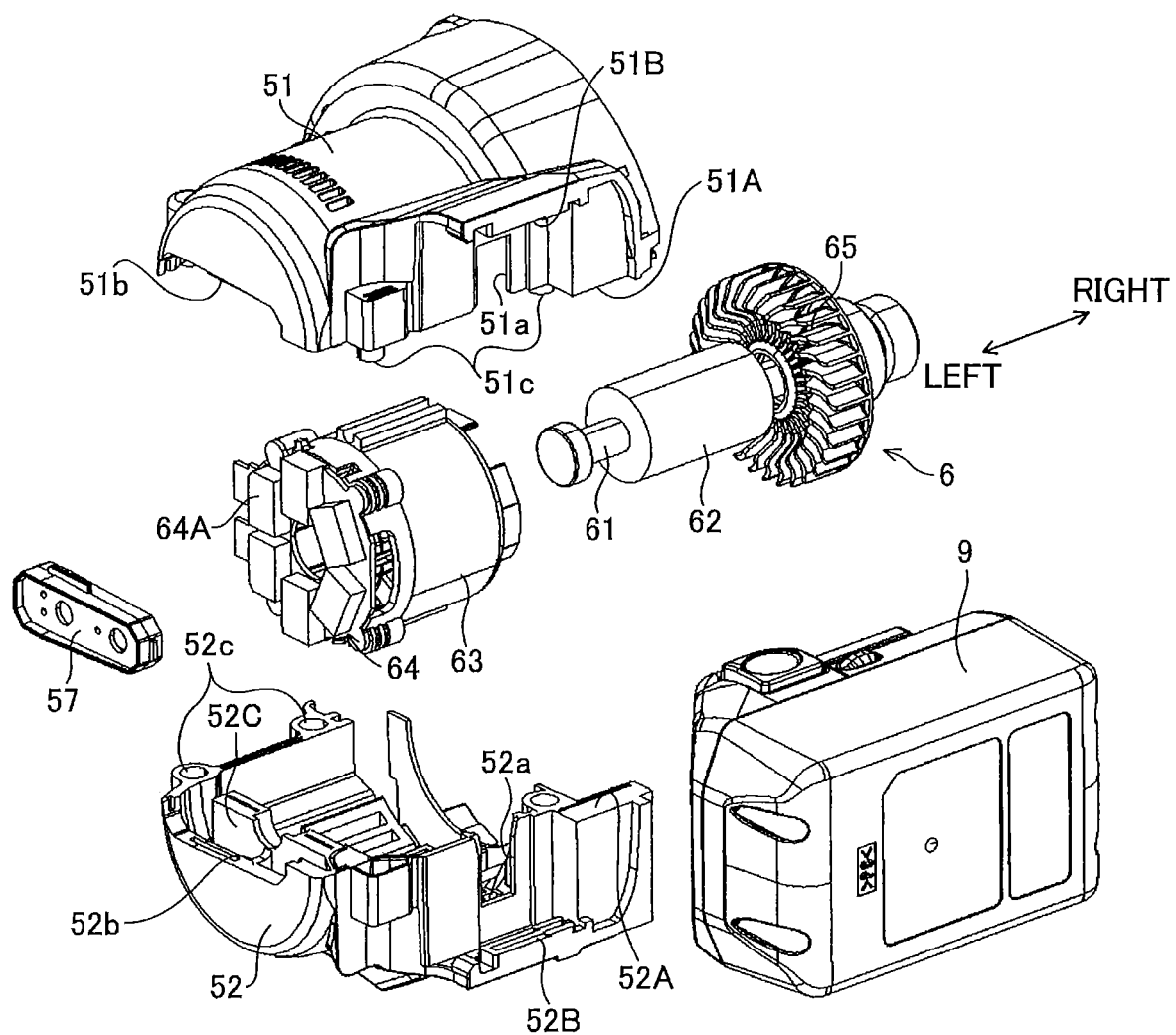
FIG. 7 is an exploded perspective view of a motor housing of the table-top cutting machine according to the first embodiment of the invention.
Figure 8:
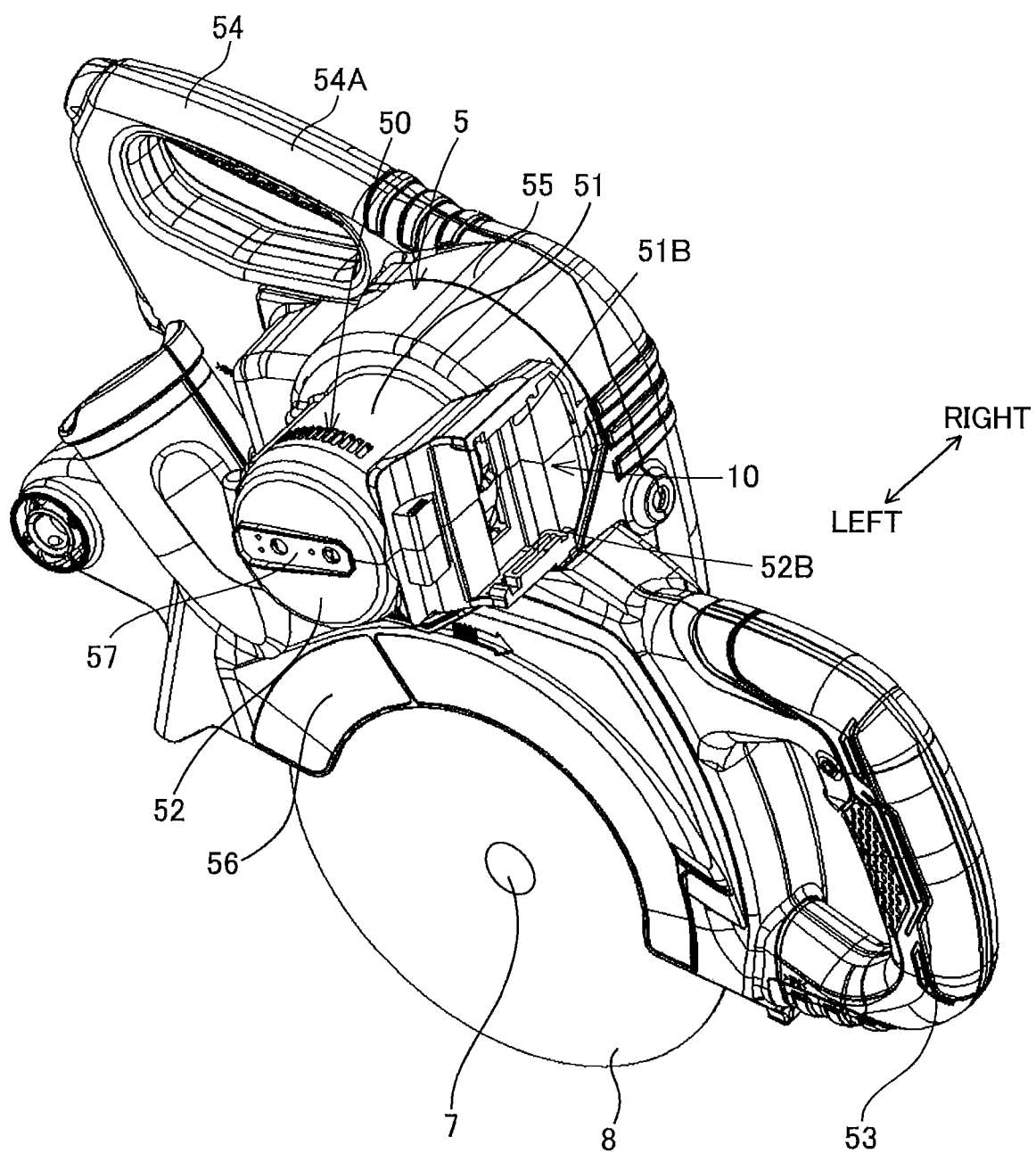
FIG. 8 is a perspective view of the cutting portion of the table-top cutting machine according to the first embodiment of the invention in a state where the battery pack is detached from the cutting portion.

As illustrated in FIGS. 1 and 2, the housing 5 has a motor housing 50, an operating handle 53, a conveying handle 54, a gear accommodating portion 55, and a saw cover 56. The motor housing 50 houses the motor 6 (FIG. 7) therein, and is provided with a battery pack attachment portion 10, a display unit 57, and a connecting terminal 58 electrically connected to the battery pack 9. In order to suppress the drive sound of the table-top cutting machine 1 and to suppress the consumption of energy in the battery pack 9, the display unit 57 is provided with a changeover switch 57A and a battery remaining capacity display switch 57B. The changeover switch 57A is for switching to a silent mode for controlling the rotational speed of the motor 6 with a low speed rotation. The battery remaining capacity display switch 57B is for displaying the remaining capacity of the battery pack 9. The display unit 57 is disposed on the left end surface of the motor housing 50. In FIGS. 3, 4, 7, 8, 10, and 12, illustrations of the changeover switch 57A and the battery remaining capacity display switch 57B are omitted. In FIGS. 7 and 8, the connecting terminal 58 is not illustrated.

As illustrated in FIG. 7, the motor housing 50 is a split type (two-split) housing including a first motor housing 51 and a second motor housing 52. The first motor housing 51 and the second motor housing 52 are examples of the split pieces of the invention.

The first motor housing 51 includes a first mating surface 51A that abuts against the second motor housing 52, a first rail portion 51B capable of engaging with the battery pack 9, and a plurality of first screw hole portions 51c. The first motor housing 51 is formed with a first electrode groove 51a and a first display groove 51b. The first rail portion 51B extends in parallel to the motor output shaft 61, and protrudes toward the second motor housing 52. The first electrode groove 51a and the first display groove 51b are formed so as to be recessed in a direction orthogonal to the motor output shaft 61. The plurality of first screw hole portions 51c form a boss shape protruding from the first mating surface 51A, are formed with a female screw, and are formed in a direction orthogonal to the motor output shaft 61.

The second motor housing 52 includes a second mating surface 52A that abuts against the first mating surface 51A, a second rail portion 52B capable of engaging with the battery pack 9, and a wall portion 52C. In the second motor housing 52, a second electrode groove 52a, a second display groove 52b, and a plurality of second screw holes 52c are formed. The first mating surface 51A and the second mating surface 52A have a structure in which they abut against each other on a plane extending in parallel to the motor output shaft 61. That is, the first mating surface 51A, the second mating surface 52A, and the motor output shaft 61 are parallel to each other when viewed from a direction orthogonal to the motor output shaft 61. In the structure of the embodiment, the motor output shaft 61 is located on a plane including the first mating surface 51A and the second mating surface 52A. The second rail portion 52B extends in parallel with the motor output shaft 61 and protrudes toward the first motor housing 51. The first mating surface 51A and the second mating surface 52A are examples of the mating surface of the invention. The first rail portion 51B and the second rail portion 52B are examples of the rail portion of the invention.

The wall portion 52C rotatably supports the motor output shaft 61. A wall portion (not illustrated) is also provided on the first motor housing 51, and a space for accommodating the motor 6 is defined by abutment between a wall portion (not illustrated) and the wall portion 52C. The second electrode groove 52a and the second display groove 52b are formed so as to be recessed in a direction orthogonal to the motor output shaft 61. When the first motor housing 51 and the second motor housing 52 are coupled to each other in a state where the motor 6, the display unit 57, and the connecting terminal 58 are disposed inside, the connecting terminal 58 is interposed by the first electrode groove 51a and the second electrode groove 52a, and the display unit 57 is interposed by the first display groove 51b and the second display groove 52b. The plurality of second screw holes 52c are capable of receiving the bosses of the first screw hole portions 51C, and penetrate through the second motor housing 52 in a direction orthogonal to the motor output shaft 61.

When the first motor housing 51 and the second motor housing 52 are coupled to each other, the first rail portion 51B and the second rail portion 52B extend in parallel with the motor output shaft 61, respectively, and the battery pack attachment portion 10 is formed in the motor housing 50. The first motor housing 51 and the second motor housing 52 are fixed to each other when a screw (not illustrated) penetrates through the corresponding second screw hole 52c and is screwed with a female screw of the first screw hole portion 51C. A screw (not illustrated) is inserted from the second motor housing 52 toward the first motor housing 51. As a result, since the first screw hole portion 51C and the second screw hole 52c open substantially downward, accumulation of dust can be prevented in the respective holes.

Figure 3:
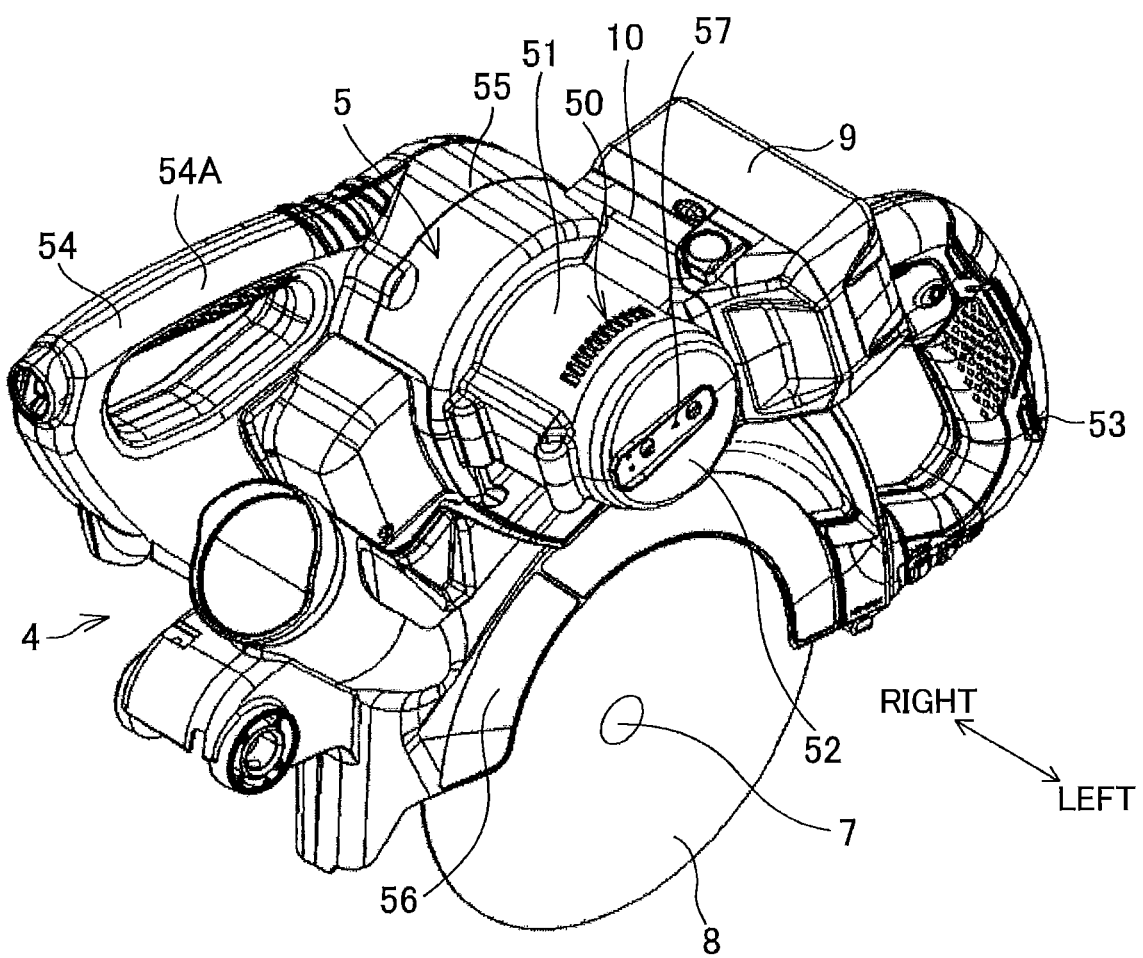
FIG. 3 is a perspective view of the cutting portion of the table-top cutting machine according to the first embodiment of the invention.
Figure 4:
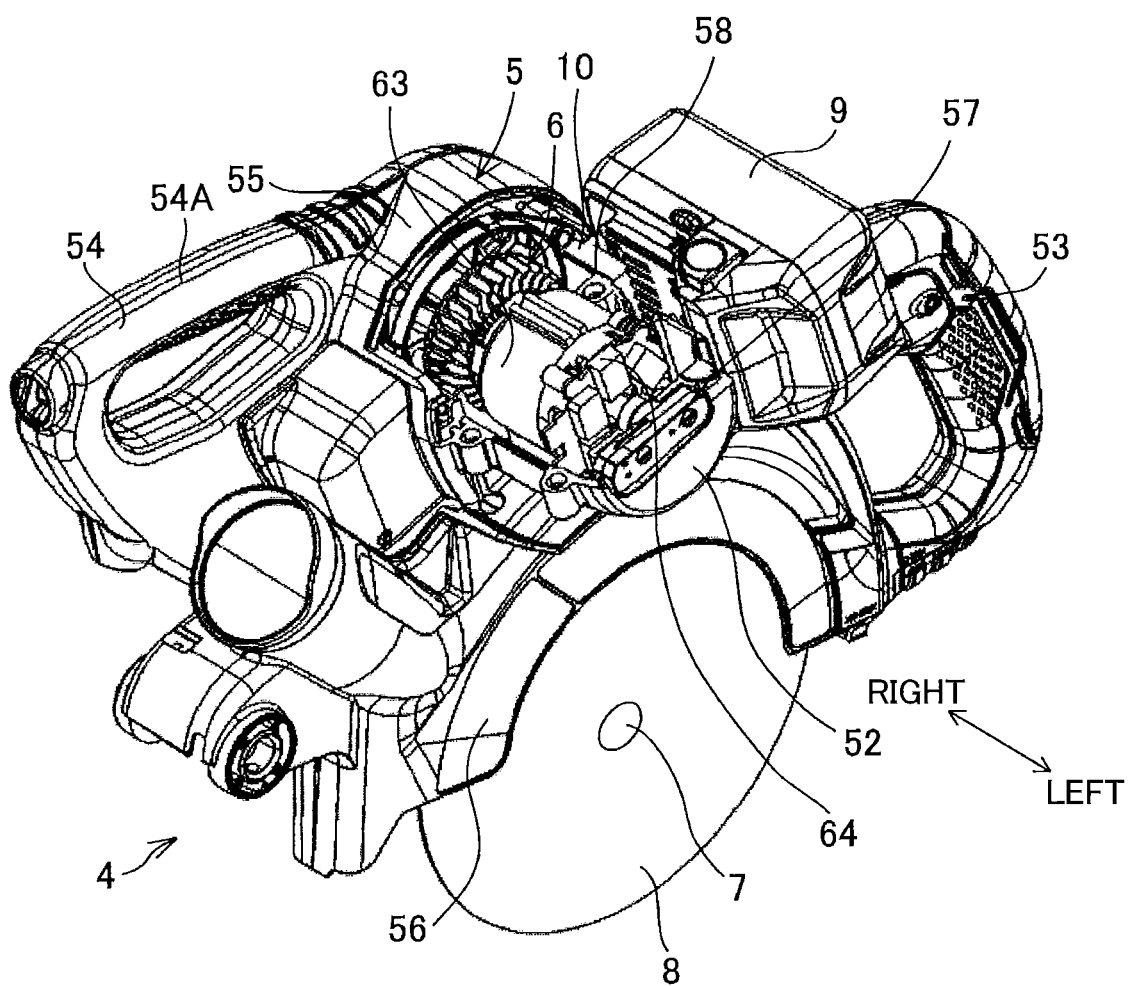
FIG. 4 is a perspective view of the table-top cutting machine according to the first embodiment of the invention in a state where a first motor housing is detached from the cutting portion.

The battery pack attachment portion 10 and the motor 6 are disposed in a direction orthogonal to the output shaft 7 with respect to the output shaft 7. In other words, as illustrated in FIGS. 3 and 4, the battery pack 9, the battery pack attachment portion 10, and the motor 6 are disposed radially outward of the cutting blade 8. The battery pack 9 is attachable to and detachable from the battery pack attachment portion 10 along the direction (attachment-detachment direction D) in which the first rail portion 51B and the second rail portion 52B extend. As illustrated in FIG. 2, the extension direction of the first rail portion 51B and the second rail portion 52B, that is, the attachment-detachment direction D is the left-right direction. In other words, the attachment-detachment direction D is orthogonal to the sliding direction S of the cutting portion 4 in the front view. When mounting the battery pack 9, the battery pack 9 is inserted in the right direction in the front view. When the tilting motion of the cutting portion 4 is allowed only in the counterclockwise direction L by the set pin 29, the mounting direction (right direction) of the battery pack 9 is substantially opposite to the tilting direction of the cutting portion 4. When the battery pack 9 is mounted in the attachment-detachment direction D in the state of FIG. 2, since the tilting motion in the clockwise direction R is restricted, the cutting portion 4 can be prevented from being tilted in the clockwise direction R when the battery pack 9 is attached.

Figure 5:
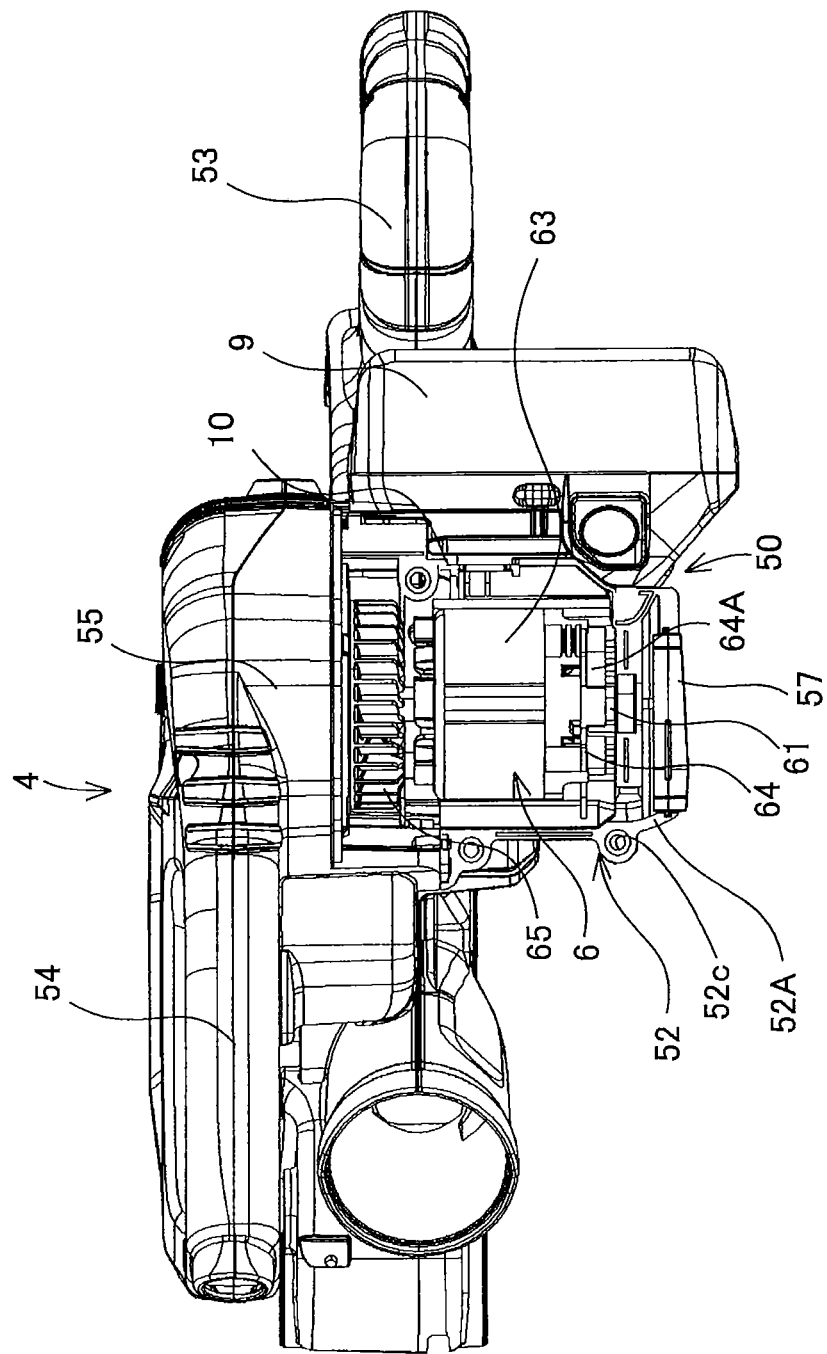
FIG. 5 is a plan view of the table-top cutting machine according to the first embodiment of the invention in a state where the first motor housing is detached from the cutting portion.

As illustrated in FIG. 6, the battery pack attachment portion 10 is located at the front part of the motor housing 50 when the cutting portion 4 is located at the proximity position. As illustrated in FIGS. 3, 4 and 5, the left end portion of the motor housing 50 is located rightward relative to the left end portion of the battery pack 9 mounted on the battery pack attachment portion 10. In other words, the length of the battery pack 9 in the longitudinal direction is longer than the lengths of the motor 6 and the motor housing 50 in the longitudinal direction. When the battery pack 9 is mounted to the battery pack attachment portion 10, the electric power of the battery pack 9 can be supplied to the table-top cutting machine 1 via the connecting terminal 58.

As illustrated in FIG. 1, the operating handle 53 is provided in front of the battery pack attachment portion 10 and the motor housing 50, and is located above the cutting blade 8 when the cutting portion 4 is located at the spaced position. The operating handle 53 has a substantially D shape in a side view, and a switch trigger 53A for controlling turning on/off of the motor 6 is provided. The operator grasps the operating handle 53 and can move the cutting portion 4 from the spaced position to the proximity position.

The conveying handle 54 is provided behind the operating handle 53 and behind the motor housing 50. The operating handle 53 and the conveying handle 54 are arranged side by side in the direction (a substantially front-rear direction) parallel to the side surface of the cutting blade 8 in a side view. The motor 6, the battery pack attachment portion 10, and the battery pack 9 are disposed between the operating handle 53 and the conveying handle 54. The expression "between the operating handle 53 and the conveying handle 54" means that, if assuming that a band shape passes through the operating handle 53 and the conveying handle 54 in the side view, at least a part of the member overlaps the band shape. As illustrated in FIG. 6, the conveying handle 54 is substantially horizontal when the cutting portion 4 is located at the proximity position, and an operator easily grasps the conveying handle 54, when conveying the table-top cutting machine 1 in a state in which the cutting portion 4 is fixed at the proximity position by a lock pin 35C.

The conveying handle 54 is provided with a conveyance grasping portion 54A grasped by an operator when conveying the table-top cutting machine 1. As illustrated by the two-dot chain line in FIG. 6, the upper end portion of the conveyance grasping portion 54A is located to be higher than the battery pack 9 mounted to the battery pack attachment portion 10. As a result, the size in the vertical direction is suppressed at the time of conveyance, and the table-top cutting machine 1 can be conveyed in a compact state. A grasping hole 54a is formed in the conveying handle 54, and when the cutting portion 4 is located at the proximity position, the grasping hole 54a extends substantially in the front-rear direction.

As illustrated in FIG. 3, the gear accommodating portion 55 is located on the right side of the motor housing 50. As illustrated in FIG. 1, the gear accommodating portion 55 is located at a position which overlaps the motor housing 50 in a side view, between the operating handle 53 and the conveying handle 54. A drive force transmission mechanism (not illustrated) is accommodated in the gear accommodating portion 55. The drive force transmission mechanism includes a plurality of gears to transmit the drive force from the motor 6 to the cutting blade 8. As illustrated in FIGS. 1 and 2, the gear accommodating portion 55 is provided with an illumination LED 55A extending forward and supported by a flexible support unit 55B. An operator can illuminate a desired place with the LED 55A by operating the flexible support unit 55B.

A saw cover 56 is provided on the left side surface of the gear accommodating portion 55 to cover the upper half of the cutting blade 8. A saw cover 56A is provided inside the saw cover 56 so as to be rotatable about the output shaft 7, and the saw cover 56A covers the outer periphery of the lower side of the cutting blade 8 exposed from the saw cover 56. As illustrated in FIG. 1, the saw cover 56A covers the outer periphery of the cutting blade 8 exposed from the saw cover 56 when the cutting portion 4 is located at the spaced position. As illustrated in FIG. 6, when the cutting portion 4 is located at the proximity position, the saw cover 56A rotates about the output shaft 7 by a link mechanism (not illustrated) and is accommodated in the saw cover 56 to expose the lower half of the cutting blade 8 from the saw cover 56.

As illustrated in FIG. 7, the motor 6 is a brushless motor. The motor 6 includes: a motor output shaft 61, a rotor 62 fixed to the motor output shaft 61, a stator 63 facing the rotor 62 in the radial direction of the motor output shaft 61, an inverter circuit 64 fixed to the left end portion of the stator 63, and a cooling fan 65 fixed to the motor output shaft 61. As illustrated in FIG. 2, the motor output shaft 61 extends in the left-right direction. A right end portion of the motor output shaft 61 is engaged with a drive force transmission mechanism (not illustrated) accommodated in the gear accommodating portion 55, and a left end portion of the motor output shaft 61 is rotatably supported by the wall portion 52C.

Figure 9:
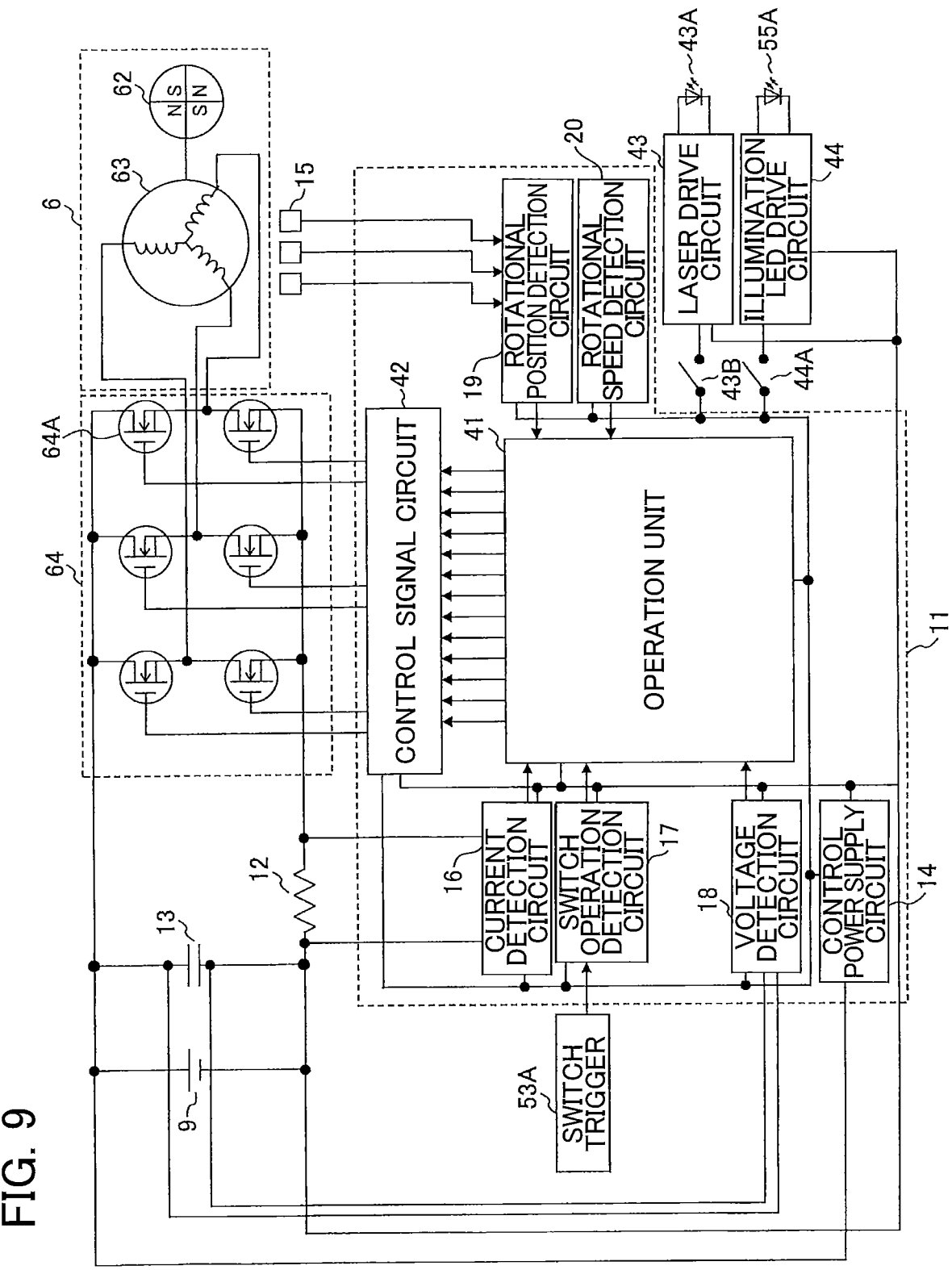
FIG. 9 is a block diagram of the table-top cutting machine according to the first embodiment of the invention.

As illustrated in FIG. 9, the rotor 62 includes two pairs of magnets, and the stator 63 is provided with a coil which faces the magnet. The inverter circuit 64 includes six switching elements 64A for controlling the driving of the motor 6, and a magnetic sensor 15 for detecting the position of the stator 63. The magnetic sensor 15 is, for example, a Hall element, and faces the rotor 62 in the left-right direction. As illustrated in FIG. 4, the inverter circuit 64 is provided at the left end portion of the stator 63. As illustrated in FIG. 5, in the axial direction of the motor output shaft 61, the stator 63 and the inverter circuit 64 are disposed so as to be contained in the full length of the battery pack 9. In other words, the battery pack 9 (the battery pack attachment portion 10), the stator 63, and the inverter circuit 64 overlap each other when viewed from a direction orthogonal to the motor output shaft 61 and passing through the battery pack attachment portion 10.

In the cutting portion 4, a control circuit board (not illustrated) having a control unit 11 (FIG. 9) is provided. The control unit 11 performs the drive control of the inverter circuit 64 and the control of the LED 55A. The inverter circuit 64 is electrically connected to the motor 6, the control unit 11, and the battery pack 9. A detection resistor 12 for current detection, and a capacitor 13 connected in parallel with the battery pack 9 are provided along the path of the drive current of the motor 6.

The control unit 11 includes a control power supply circuit 14, a current detection circuit 16, a switch operation detection circuit 17, a voltage detection circuit 18, a rotational position detection circuit 19, a rotational speed detection circuit 20, an operation unit 41, and a control signal circuit 42. The control power supply circuit 14 converts the voltage of the battery pack 9 into a voltage suitable for the operation of the control unit 11, and supplies the converted voltage to the control unit 11. The current detection circuit 16 detects the drive current of the motor 6 by the terminal voltage of the detection resistor 12. The switch operation detection circuit 17 detects an operation amount of a switch trigger 53A operated by the operator. The voltage detection circuit 18 detects the drive voltage of the motor 6 by the capacitor 13. The rotational position detection circuit 19 detects the rotational position of the motor 6, on the basis of a signal from the magnetic sensor 15. The rotational speed detection circuit 20 detects the rotational speed of the motor 6, on the basis of a signal from the rotational position detection circuit 19. On the basis of the signal from the switch operation detection circuit 17, the operation unit 41 sets a duty ratio of the PWM signal (hereinafter referred to as duty ratio) applied to each switching element 64A of the inverter circuit 64, in accordance with the operation amount of the switch trigger 53A. The operation unit 41 drives the control signal circuit 42, depending on the set duty ratio and the rotational position of the motor 6 detected by the rotational position detection circuit 19, and switches and controls each switching element 64A of the inverter circuit 64. The operation unit 41 calculates the rotational speed of the motor 6 on the basis of the detection result of the rotational position detection circuit 19, and detects the rotational speed of the cutting blade 8 from the detection result of the rotational position detection circuit 19 on the basis of the set reduction ratio of the motor 6 and the cutting blade 8.

A laser drive circuit 43 and an illumination LED drive circuit 44 are connected to the control unit 11. The laser drive circuit 43 is connected to the laser 43A, and illuminates the laser 43A on the basis of the operation of the laser switch 43B. The operator can cut the wood piece W with reference to the laser beam emitted from the laser 43A. The illumination LED drive circuit 44 is connected to the LED 55A, and turns on the illumination LED 55A on the basis of the operation of the LED switch 44A.

Next, the cutting operation of the table-top cutting machine 1 will be described. The operator mounts the battery pack 9 on the battery pack attachment portion 10 along the attachment-detachment direction D. Further, the switch trigger 53A is pulled, the motor 6 is driven to rotate the cutting blade 8, and the operating handle 53 is pushed downward to move the cutting portion 4 downward. At this time, when the cutting portion 4 swings in the clockwise direction as viewed from the left side with respect to the swinging support portion 35 as the center (axis), the cutting portion 4 moves downward. The cutting blade 8 and the wood piece W are brought into contact with each other to start cutting, and the cutting portion 4 slides with respect to the slide support unit 33 (the guide bars 33A and 33B), and the cutting portion 4 is moved rearward to cut the wood piece W.

When the wood piece W is obliquely cut, both side surfaces of the cutting blade 8 are tilted with respect to the contact surface 25. When the cutting portion 4 is tilted in the clockwise direction R of FIG. 2, the set pin 29 is completely retracted from the interior of the holder 31 to loosen the clamp 31A. Alternatively, the set pin 29 may be retracted from the interior of the holder 31 after loosening the clamp 31A. As a result, the support portion 3 and the cutting portion 4 can be tilted in the counterclockwise direction L and the clockwise direction R with respect to the base portion 2. The maximum tilt angle of the cutting portion 4 tilted in one of the counterclockwise direction L or the clockwise direction R is defined when the holder 31 abuts against a stopper bolt (not illustrated). In order to set the maximum inclined angle to 45□, a stopper bolt (not illustrated) is adjusted so that the holder 31 abuts against the holder 31 in a state of being inclined at 45□.

As described above, the desktop cutting machine according to the first embodiment of the invention has been described. According to such a configuration, the attachment-detachment direction D (FIG. 2) of the battery pack 9 is in the swinging direction of the cutting portion 4, that is, the direction intersecting with (orthogonal to) the side surface of the cutting blade 8, the cutting portion 4 is restricted from swinging during the attaching or detaching operation of the battery pack 9, and the attaching or detaching operation can be easily performed. Further, the unintended swinging of the cutting portion 4 is suppressed, and the damage to the wood piece W placed on the base 21 can be suppressed.

Further, according to such a configuration, since the battery pack attachment portion 10 can be provided in the motor housing 50, there is no need to separately prepare a housing which constitutes the battery pack attachment portion 10, and the number of components can be reduced, and the cutting portion can be downsized. Therefore, the battery pack attachment portion 10 can be manufactured and assembled with a simple configuration. Further, when lead wires are wired from the battery pack attachment portion 10 to the motor 6, since the wiring can be performed without passing through other housings, the structure can be simplified and the assembling is also easy.

According to such a configuration, the first rail portion 51B is provided in the first motor housing 51, and the second rail portion 52B is provided in the second motor housing 52. Accordingly, the rail portions can be manufactured without dividing in the longitudinal direction and in the attachment-detachment direction of the battery pack. Therefore, the accuracy of the rail portions is secured, and the battery pack 9 can be smoothly attached to and detached from the rail portions.

Further, according to such a configuration, since the connecting terminal 58 is assembled so as to be interposed between the first motor housing 51 and the second motor housing 52, there is no need for a metal fitting for attaching the connecting terminal 58 to the motor housing 50. Thus, the motor housing 50 can be easily assembled, while reliably holding the connecting terminal 58.

Further, according to such a configuration, since the display unit 57 is assembled so as to be interposed between the first motor housing 51 and the second motor housing 52, there is no need for a metal fitting for attaching these components to the motor housing 50. As a result, the motor housing 50 can be easily assembled, while reliably holding the display unit 57.

Further, according to such a configuration, since the protruding end portion of the motor housing 50 is positioned inside the battery pack 9, the full width of the small table-top cutting machine 1 can be suppressed.

Further, according to such a configuration, since the battery pack attachment portion 10 is provided between the conveying handle 54 and the operating handle 53, the distance from the battery pack attachment portion 10 to both handles becomes shorter, and it is easy to grasp one of the handles to stabilize the cutting portion 4 when holding the battery pack 9.

Further, according to such a configuration, since the battery pack 9 is located below the conveying handle 54 in a state (FIG. 6) in which the cutting portion 4 is fixed at the bottom dead center position, the table-top cutting machine 1 can reduce the overall height at the time of conveyance.

Further, according to such a configuration, the attachment-detachment direction D of the battery pack 9 is orthogonal to the sliding direction S of the cutting portion 4. Therefore, the cutting portion 4 is hard to slide by the attaching or detaching operation of the battery pack 9, and the attaching or detaching operation of the battery pack 9 can be easily performed. Further, damage to the wood piece W placed on the base 21 can be suppressed.

Further, by the configuration in which the motor 6, the connecting terminal 58, the inverter circuit 64, and the display unit 57 are accommodated within the dimension in the longitudinal dimension (left-right direction) of the battery pack 9, the table-top cutting machine 1 can be downsized to provide the suppressed dimension (full width) of the cutting portion 4 in the left-right direction.

Further, with such a configuration, since the configurations unique to the DC-driven table-top cutting machine 1, such as the battery pack 9, the inverter circuit 64, and the display unit 57 are concentrated in the motor housing 50, the configuration other than the motor housing 50 can be used in common with the cutting machine driven with AC. Therefore, the manufacturing cost of the table-top cutting machine 1 can be reduced.

In the above-described embodiment, the attachment-detachment direction D of the battery pack 9 is a direction orthogonal to the side surface of the cutting blade 8, but the attachment-detachment direction may be a direction in which the attachment-detachment direction D intersects with the side surface of the cutting blade 8. As a result, since the component in the vertical direction in the mounting direction is reduced, the cutting portion 4 can be prevented from swinging. Hereinafter, modified examples thereof will be described.

Second Embodiment

Figure 10:
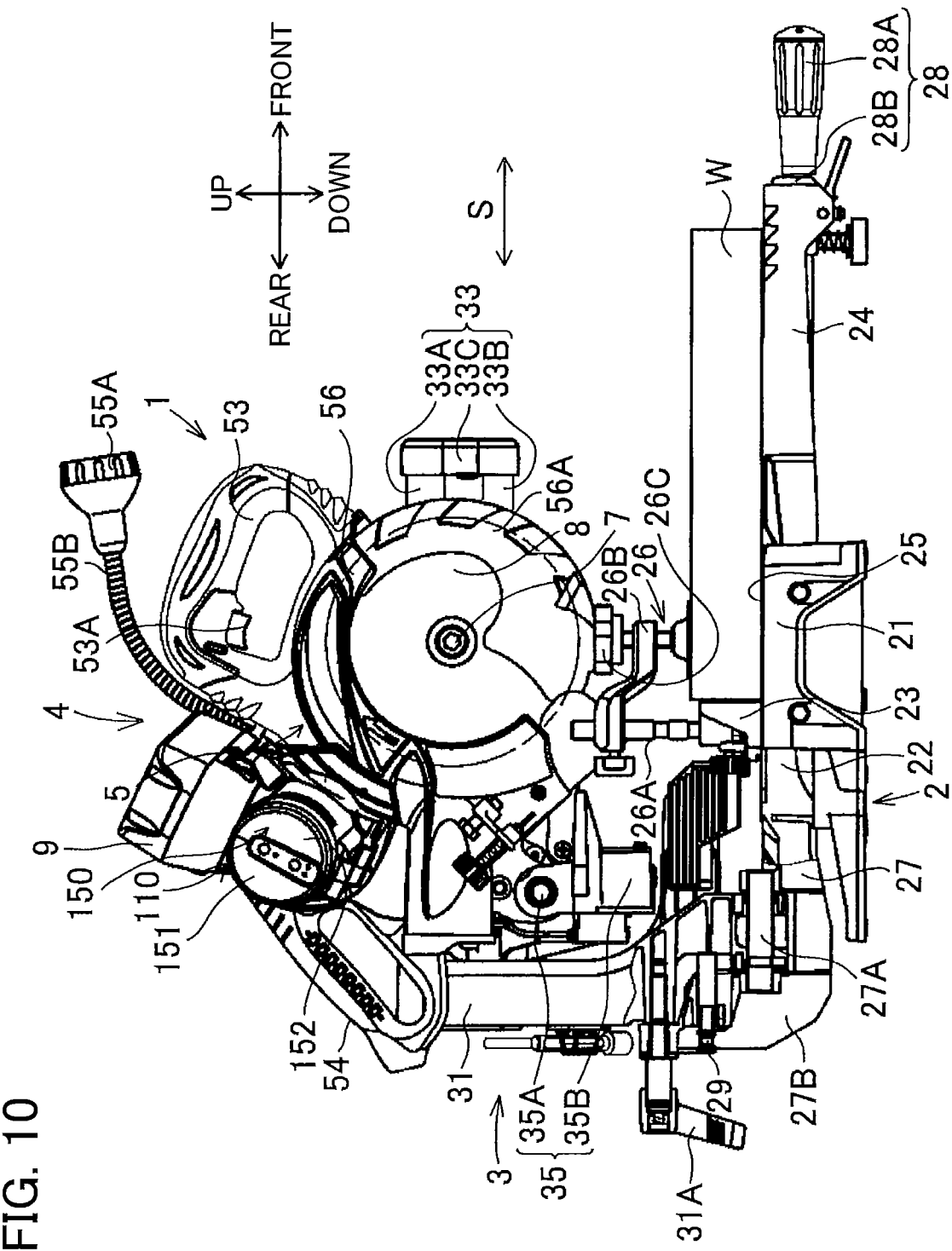
FIG. 10 is a side view of a table-top cutting machine according to a second embodiment of the invention in a state where a cutting portion is positioned at a spaced position.

A second embodiment which is a modified example of the invention will be described with reference to FIGS. 10 to 12. The same configurations as those in the first embodiment are denoted by the same reference numerals, and description thereof will be omitted. In the second embodiment, the attachment-detachment direction D of the battery pack 9 is different from that of the first embodiment.

The motor housing 150 includes a first motor housing 151 and a second motor housing 152, and both are fixed to each other to form the battery pack attachment portion 110. The motor housing 150 is provided with a connecting terminal 158. As illustrated in FIG. 11, the motor housing 150 extends diagonally leftward and upward in the front view. Further, as illustrated in FIG. 10, when the cutting portion 4 is located at the spaced position, the motor housing 150 is inclined in the front-rear direction and is also inclined in the vertical direction. As illustrated in FIG. 12, when the cutting portion 4 is located at the proximity position, the motor housing 150 is swung in the vertical direction. As in the first embodiment, all of the motor housing 150, the motor output shaft 61, the first rail portion 51B, and the second rail portion 52B extend in the same direction.

Figure 11:
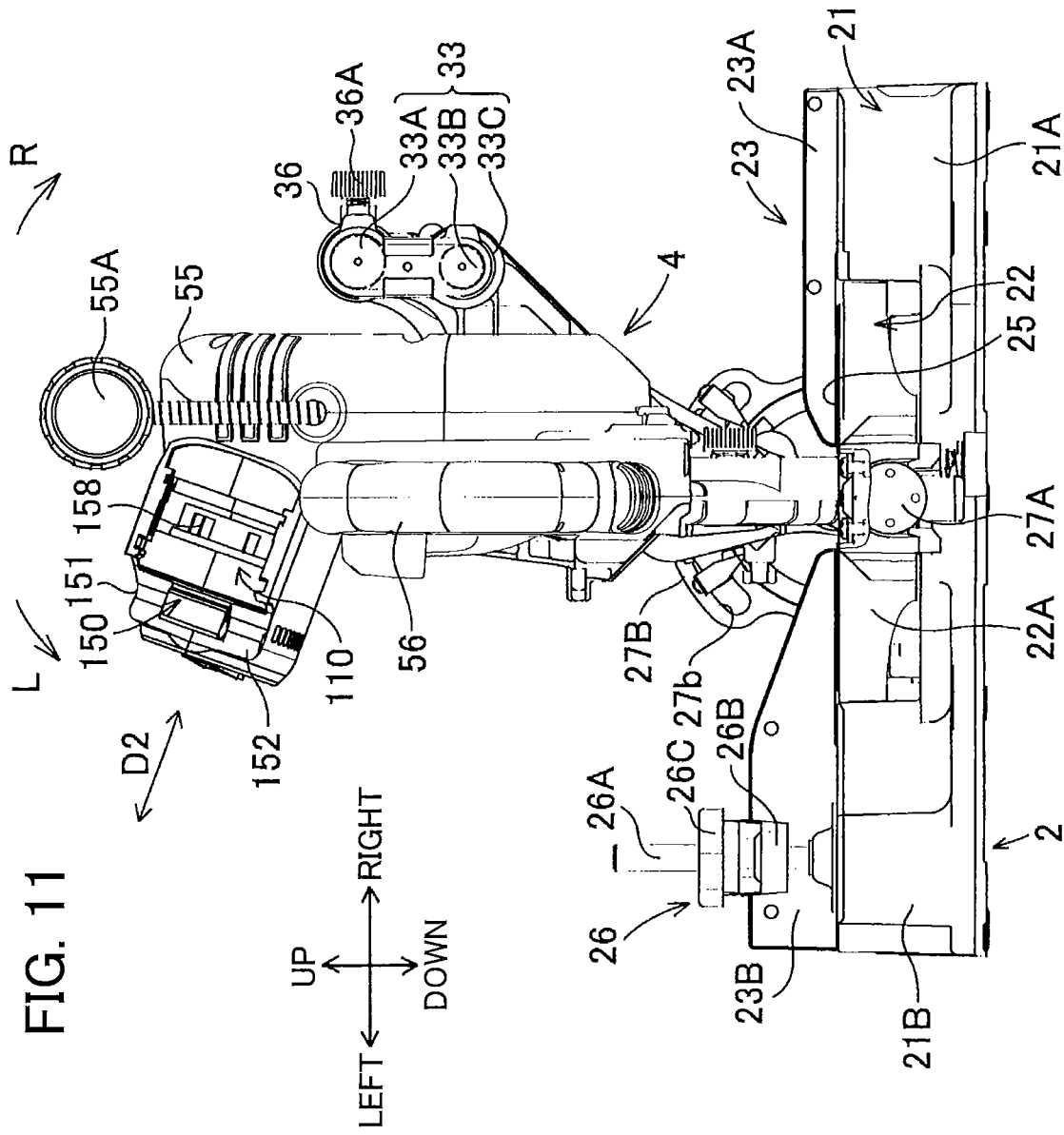
FIG. 11 is a front view of the table-top cutting machine according to the second embodiment of the invention in a state where a battery pack is detached from the table-top cutting machine.
Figure 12:
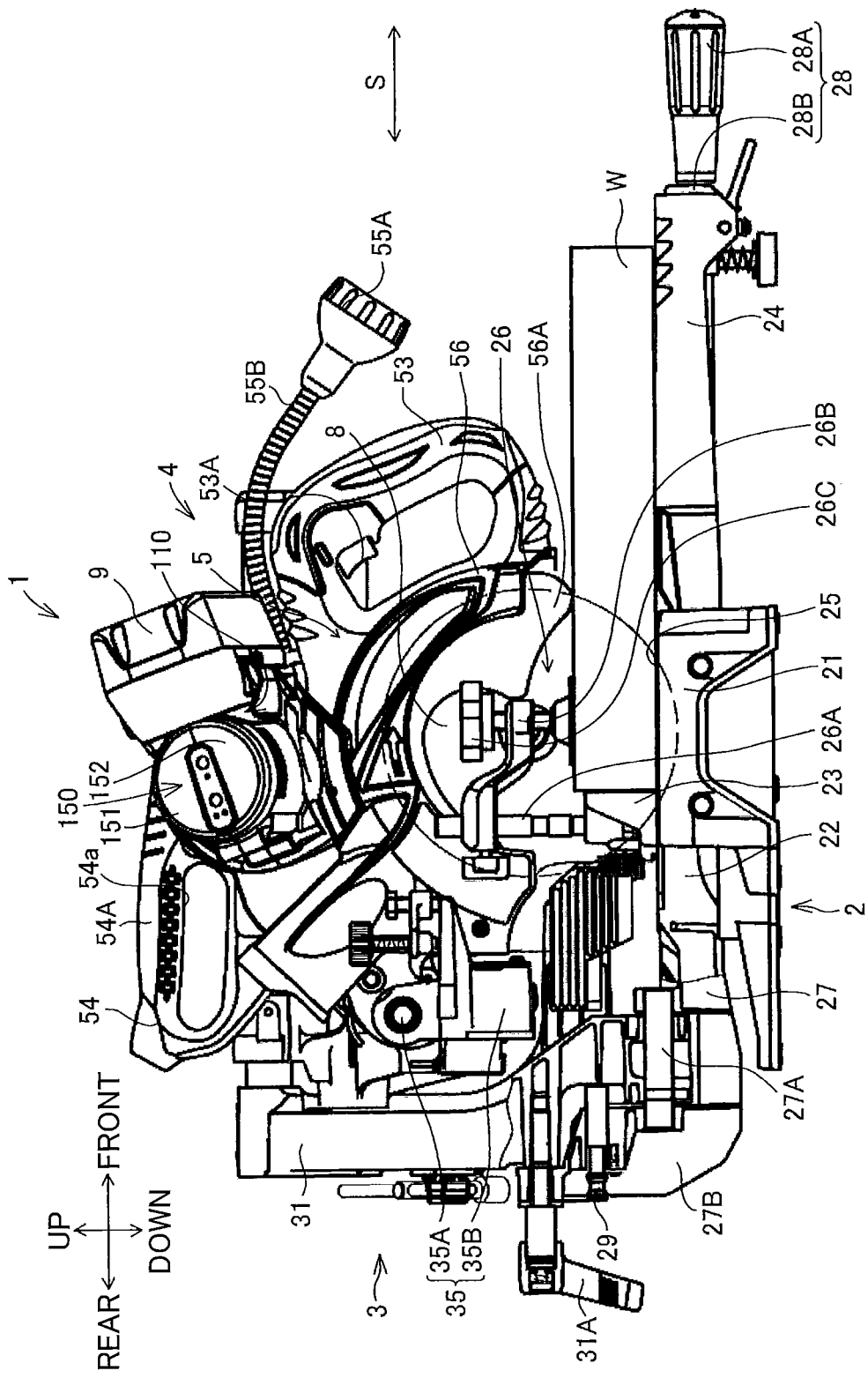
FIG. 12 is a side view of the table-top cutting machine according to the second embodiment of the invention in a state where the cutting portion is positioned at a proximity position.

As illustrated in FIG. 11, the attachment-detachment direction D2 of the battery pack 9 is the diagonally leftward-upward direction in the front view. The attachment-detachment direction D2 is the direction intersecting with the side surface (a vertical surface extending in the vertical direction) of the cutting blade 8. When the cutting portion 4 is located at the proximity position (the state of FIG. 11), the attachment-detachment direction D2 is the direction in which the diagonally left upper side and the diagonally right lower side are connected to each other. As illustrated in FIG. 10, when the cutting portion 4 is located at the spaced position, the attachment-detachment direction D intersects with the sliding direction S. As illustrated in FIGS. 11 and 12, when the cutting portion 4 is located at the proximity position, the attachment-detachment direction D is orthogonal to the sliding direction S. That is, when the cutting portion 4 is located at the proximity position, the attachment-detachment direction D and the sliding direction S are substantially orthogonal to each other in the plan view.

According to such a configuration, when the cutting portion 4 is located at the proximity position, unintended sliding of the cutting portion 4 can be suppressed. When the cutting portion 4 is tilted in the counterclockwise direction L, since the distance between the motor housing 150 and the base portion 2 increases, the cutting portion 4 can be further tilted in the counterclockwise direction L. Furthermore, since a space can be secured between the cutting portion 4 and the base portion 2 in a state where the cutting portion 4 is tilted in the counterclockwise direction L, the battery pack 9 can be easily attached and detached, and it is easy to check and operate the display unit. Furthermore, since the display unit 57 faces upward, it is easy to check and operate the display unit.

The cutting machine according to the invention is not limited to the above-described embodiment, and various modifications can be made within the scope of the invention. For example, the table-top cutting machine 1 is used as a cutting machine in the disclosure, but a portable cutting machine can also be used.

In the above embodiment, the motor housing 50 is the two-split housings having the first mating surface 51A and the second mating surface 52A extending in parallel to the axial direction of the motor output shaft 61 of the motor 6 when viewed from a direction orthogonal to the motor output shaft 61, but the invention is not limited thereto. For example, the motor housing 50 may be an integrally molded motor housing or a split type (two-split) housing having a mating surface orthogonal to the axial direction of the motor output shaft.

In the above-described embodiment, the motor housing 50 is constituted by two-split housings of the first motor housing 51 and the second motor housing 52, but the invention is not limited thereto. The motor housing 50 may be constituted by a housing divided into three or more sections. In that case, it is preferable that the connecting terminal and the display unit are interposed by at least two of the housings divided into three or more sections.

In the above-described embodiment, the battery pack attachment portion 10 is provided in front of the motor housing 50 when the cutting portion 4 is located at the proximity position (FIG. 6), but the invention is not limited thereto. For example, the battery pack attachment portion may be disposed behind the motor housing 50. Further, the battery pack attachment portion may be disposed on either the first motor housing or the second motor housing.

In the above embodiment, the motor 6 uses a brushless motor. Alternatively, a motor with a brush may be used.

In the above embodiment, the battery pack attachment portion 10 is provided in the motor housing 50, but the invention is not limited thereto. As long as the position is on the housing 5 of the cutting portion 4, the battery pack attachment portion 10 can be provided at any position on condition that the attachment-detachment direction D of the battery pack 9 is the direction intersecting with the side surface of the cutting blade 8. For example, the battery pack attachment portion 10 may be provided in the operating handle 53, the conveying handle 54, or may be provided in the gear accommodating portion 55.

The attachment-detachment direction of the battery pack 9 is not limited to the above-described embodiment, and may be other directions as long as the direction intersects with the side surface of the cutting blade 8.

In the above embodiment, the slide-type or tiltable tabletop cutting machine 1 is used, but the invention is not limited thereto. The invention can also be applied to a cutting machine that does not use a slide mechanism or that is not tiltable. The slide structure is not limited to the configuration in which the cutting portion 4 slides on the guide bars 33A and 33B. Alternatively, the slide structure may have a configuration in which the cutting portion 4 and the guide bars 33A and 33B slide together.

REFERENCE SIGNS LIST

1 . . . table-top cutting machine, 2 . . . base portion, 3 . . . support portion, 4 . . . cutting portion, 5 . . . housing, 6 . . . motor, 7 . . . output shaft, 8 . . . cutting blade, 9 . . . battery pack, 10 . . . battery pack attachment portion, 21 . . . base, 27 . . . housing support portion, 27A . . . tilting shaft portion, 35A . . . swing shaft, 33 . . . slide support portion, 33A,33B . . . guide bar, 36 . . . slide portion, 50, 150 . . . motor housing, 51,151 . . . first motor housing, 51A . . . first mating surface, 51B . . . first rail portion, 52, 152 . . . second motor housing, 52A . . . second mating surface, 52B . . . second rail portion, 53 . . . operating handle, 54 . . . conveying handle, 53A . . . switch trigger, 57 . . . display unit, 57A . . . changeover switch, 58 . . . connecting terminal, 62 . . . rotor, 63 . . . stator, 64 . . . inverter circuit

What is claimed is:

1. A cutting machine comprising:
    a cutting portion comprising:
        a motor;
        a motor housing accommodating the motor therein;
        an output shaft rotatable upon rotation of the motor, a cutting blade being detachably attachable to the output shaft;
        a battery serving as a power source of the motor; and
        a battery attachment portion including a pair of rail portions with which the battery is detachably attachable and engageable;
    a base having a contact surface on which a workpiece is configured to be placed; and
    a swing support mechanism connected to the base and the cutting portion, the swing support mechanism including a swing shaft extending in parallel to the output shaft, the swing support mechanism supporting the cutting portion such that the cutting portion is swingable about the swing shaft in a first direction between a top dead center and a bottom dead center, the first direction being a direction parallel to a side surface of the cutting blade,
    wherein the battery is attachable to the battery attachment portion by slidingly moving the battery in a second direction relative to the battery attachment portion, the second direction crossing the first direction,
        wherein the cutting blade is rotatable about a rotational axis, and
        wherein the motor is provided such that a rotational shaft of the motor is inclined relative to the rotational axis.

2. The cutting machine according to claim 1, wherein the cutting portion is slidingly movable in a sliding direction, and
    wherein the second direction crosses the sliding direction.

3. The cutting machine according to claim 1, wherein the battery is disposed at a position radially outward of the motor.

4. The cutting machine according to claim 1, further comprising a sliding supporting mechanism supporting the cutting portion such that the cutting portion is slidingly movable in a sliding direction parallel to the contact surface,
    wherein the cutting blade is rotatable about a rotational axis extending in an axial direction, and
    wherein the battery and the motor are provided at one side of the cutting blade in the axial direction and the sliding supporting mechanism is provided at another side of the cutting blade in the axial direction.

5. The cutting machine according to claim 1, wherein the cutting portion is slidingly movable in a sliding direction, and
    wherein, in a state where the cutting portion is positioned at the bottom dead center, the second direction is perpendicular to the sliding direction.

6. The cutting machine according to claim 1, further comprising:
    a sliding supporting mechanism supporting the cutting portion such that the cutting portion is slidingly movable in a sliding direction parallel to the contact surface; and
    a locking member configured to restrict the cutting portion in a proximity position from moving, the cutting portion in the proximity position being in proximity to the contact surface,
    wherein, in a state where the locking member restricts the cutting portion in the proximity position from moving, the second direction is perpendicular to the sliding direction.

7. A cutting machine comprising:
    a cutting portion comprising:
        a motor;
        a motor housing accommodating the motor therein;
        an output shaft rotatable about a rotational axis upon rotation of the motor, a cutting blade being detachably attachable to the output shaft;
        a battery serving as a power source of the motor; and
        a battery attachment portion including a pair of rail portions with which the battery is detachably attachable and engageable;
    a base having a contact surface on which a workpiece is configured to be placed;

a swing support mechanism connected to the base and the cutting portion, the swing support mechanism including a swing shaft extending in parallel to the output shaft, the swing support mechanism supporting the cutting portion such that the cutting portion is swingable about the swing shaft between a top dead center and a bottom dead center; and a sliding supporting mechanism supporting the cutting portion such that the cutting portion is slidingly movable in a sliding direction parallel to the contact surface, wherein the battery is attachable to the battery attachment portion by slidingly moving the battery in an attaching direction relative to the battery attachment portion, the attaching direction crossing an imaginary plane which is both parallel to and including a side surface of the cutting blade, wherein the cutting blade is rotatable about the rotational axis, and wherein the battery and the motor are provided at one side of the cutting blade in the axial direction and the sliding supporting mechanism is provided at another side of the cutting blade in an axial direction of the rotational axis.

8. The cutting machine according to claim 7, wherein the attaching direction crosses the sliding direction.

9. The cutting machine according to claim 7, wherein the battery is disposed at a position radially outward of the motor.

10. The cutting machine according to claim 7, wherein, in a state where the cutting portion is positioned at the bottom dead center, the attaching direction is perpendicular to the sliding direction.

11. The cutting machine according to claim 7, further comprising a locking member configured to restrict the cutting portion in a proximity position from moving, the cutting portion in the proximity position being in proximity to the contact surface, wherein, in a state where the locking member restricts the cutting portion in the proximity position from moving, the attaching direction is perpendicular to the sliding direction.

12. The cutting machine according to claim 7, further comprising a locking member configured to restrict the cutting portion in a proximity position from moving, the cutting portion in the proximity position being in proximity to the contact surface, wherein, in a state where the locking member restricts the cutting portion in the proximity position from moving, the battery is positioned below an upper end of the cutting portion.

13. A cutting machine comprising:
a cutting portion comprising:
  a motor;
  a motor housing accommodating the motor therein;
  an output shaft rotatable about a rotational axis upon rotation of the motor, a cutting blade being detachably attachable to the output shaft;
  a battery serving as a power source of the motor; and
  a battery attachment portion including a pair of rail portions with which the battery is detachably attachable and engageable;

a base having a contact surface on which a workpiece is configured to be placed; and a swing support mechanism connected to the base and the cutting portion, the swing support mechanism including a swing shaft extending in parallel to the output shaft, the swing support mechanism supporting the cutting portion such that the cutting portion is swingable about the swing shaft between a top dead center and a bottom dead center, wherein the battery is attachable to the battery attachment portion by slidingly moving the battery in an attaching direction relative to the battery attachment portion, the attaching direction crossing an imaginary plane which is both parallel to and including a side surface of the cutting blade, wherein the motor is provided such that a rotational shaft of the motor is inclined relative to the rotational axis, and wherein the pair of rail portions are inclined relative to the rotational axis.

14. The cutting machine according to claim 13, wherein the cutting portion is slidingly movable in a sliding direction, and wherein the attaching direction crosses the sliding direction.

15. The cutting machine according to claim 13, wherein the battery is disposed at a position radially outward of the motor.

16. The cutting machine according to claim 13, further comprising a sliding supporting mechanism supporting the cutting portion such that the cutting portion is slidingly movable in a sliding direction parallel to the contact surface, wherein the cutting blade is rotatable about a rotational axis extending in an axial direction, and wherein the battery and the motor are provided at one side of the cutting blade in the axial direction and the sliding supporting mechanism is provided at another side of the cutting blade in the axial direction.

17. The cutting machine according to claim 13 wherein the cutting portion is slidingly movable in a sliding direction, and wherein, in a state where the cutting portion is positioned at the bottom dead center, the attaching direction is perpendicular to the sliding direction.

18. The cutting machine according to claim 13, further comprising:
  a sliding supporting mechanism supporting the cutting portion such that the cutting portion is slidingly movable in a sliding direction parallel to the contact surface; and
  a locking member configured to restrict the cutting portion in a proximity position from moving, the cutting portion in the proximity position being in proximity to the contact surface,
  wherein, in a state where the locking member restricts the cutting portion in the proximity position from moving, the attaching direction is perpendicular to the sliding direction.

* * * * *